United States Patent [19]
Perry et al.

[11] Patent Number: 5,511,290
[45] Date of Patent: Apr. 30, 1996

[54] ELASTIC CORD TENSIONING AND LENGTH ADJUSTING APPARATUS

[75] Inventors: David L. Perry; Thomas S. Weaver, both of Essex Junction, Vt.

[73] Assignee: D P Design, Inc., Williston, Vt.

[21] Appl. No.: 276,791

[22] Filed: Jul. 18, 1994

[51] Int. Cl.⁶ .................................................. F16G 11/00
[52] U.S. Cl. ...................... 24/115 H; 24/129 A; 24/712.1
[58] Field of Search ............................. 24/115 H, 115 M, 24/129 R, 129 A, 136 R, 136 L, 300, 712.1

[56] References Cited

U.S. PATENT DOCUMENTS

| | | | |
|---|---|---|---|
| 536,031 | 3/1895 | Hood | 24/129 A |
| 1,379,093 | 5/1921 | Freeberg | 24/115 H |
| 2,246,091 | 6/1941 | Forstner | 24/115 H |
| 2,832,116 | 4/1958 | Clevett, Jr. et al. | 24/115 H |
| 4,222,157 | 9/1980 | Forman | 24/129 A |

FOREIGN PATENT DOCUMENTS 0572449  6/1958  Italy ....................................... 24/712.1

*Primary Examiner*—Victor N. Sakran
*Attorney, Agent, or Firm*—Thomas N. Nieman

[57] ABSTRACT

The elastic cord tensioning and length adjusting apparatus is designed to allow the user to have much more flexibility with a single length elastic cord, rather than using a number of cords of different lengths. The apparatus can adjust, both the tension and length of elastic cords, by allowing the user to loop different lengths of the cord in a mechanism that can lock the looped section of elastic cord so that the length of the cord not in the loop is shortened and the tension is increased. The apparatus comprises a main horizontal body having two apertures designed for the cord to pass through. A locking mechanism fits into a center aperture in the main horizontal body and has two end notches to allow the elastic cord to fit into those notches. A spring tensioning device and a retaining piece maintain the lock in position.

9 Claims, 1 Drawing Sheet

ELASTIC CORD TENSIONING AND LENGTH ADJUSTING APPARATUS

BACKGROUND OF THE INVENTION

This invention pertains to elastic cords, and in particular, to such elastic cords tensioning and length adjusting apparatus that are designed to be attached the elastic cord and allows the user to position and maintain the tieing down of an item with a single length cord instead of having a number of cords of different lengths for each application.

It is very common to have elastic type cords for strapping items on the top of cars or in the back of tracks in both commercial and household situations. Examples of these situations include moving furniture in a pick up truck. It has been the practice to have elastic cords of various lengths with hooks on each end being used to strap down the item that is to be carried, positioned and maintained in position. The user had to have a number of these cords of different lengths to accomplish different jobs. The elastic cord tensioning and length adjusting apparatus is designed to allow the user to have cords of a single length and adjusting the length and tension as necessary for the particular application. It is also a feature of the elastic cord tensioning and length adjusting apparatus to be used with such items as shoe laces to maintain tension. What is needed is an apparatus that will provide a simple and effective apparatus that can be manufactured with or attached to a standard elastic cord. It is another object of this invention to disclose an apparatus that provides a safe tool that can be used in multiple situations and be no hazard to the operators of the equipment.

It is the object of this invention to teach an elastic cord tensioning and length adjusting apparatus which avoids the disadvantages and limitations, recited above.

SUMMARY OF THE INVENTION

Particularly, it is the object of this invention to teach an elastic cord tensioning and length adjusting apparatus, for use by individuals to strap items in position and maintain them in that position, comprising a horizontal support platform; said horizontal support platform having a plurality of apertures; said horizontal support platform further having a centerline projection tube located thereon; a locking mechanism; said locking mechanism comprising a horizontal base; said horizontal base comprising cut outs at each end of said horizontal base; said horizontal base further comprising a tubular extension for positioning said tubular extension within said centerline projection tube of said horizontal support platform; and means for retaining said locking mechanism.

BRIEF DESCRIPTION OF THE INVENTION

Further objects and features of this invention will become more apparent by reference to the following description taken in conjunction with the following figures, in which:

FIG. 1 is a side elevational view of the novel elastic cord tensioning and length adjusting apparatus; and FIG. 2 is an enlarged exploded view thereof.

DESCRIPTION OF THE PREFERRED EMBODIMENTS

Figure 1:
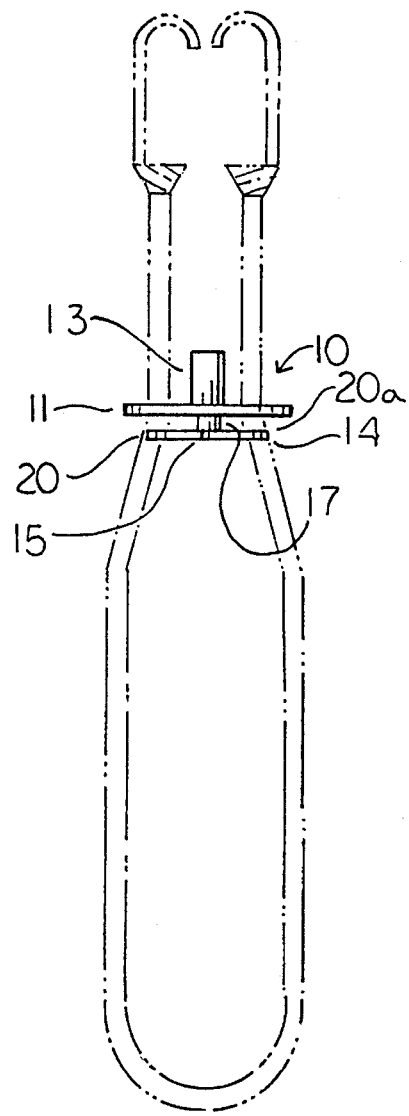
Figure 2:
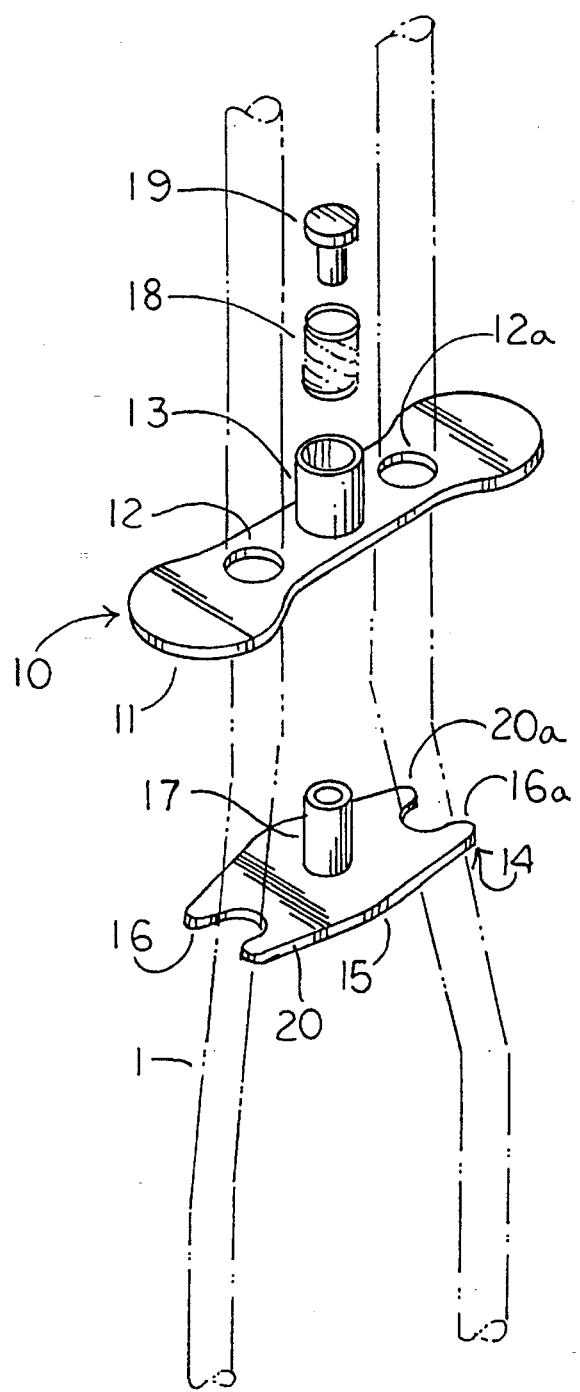

As shown in the figures, the novel elastic cord tensioning and length adjusting apparatus 10 comprises horizontal support platform 11 that contains two apertures 12 and 12a that are designed to receive the opposite ends of the elastic cord 1. The horizontal support platform 11 also has an open centerline tubular projection 13. The second part of the apparatus 10 is the locking mechanism 14 that is comprised of a smaller horizontal base 15 that has two cutout areas 16 and 16a at each end 20 and 20a of the base 15. These cut out areas 16 and 16a are also designed to receive the opposite ends of the elastic cord 1. The locking mechanism 14 has a tubular extension 17 that projects upward from the horizontal base 15 and is inserted into the centerline tubular projection 13 in the horizontal support platform 11. A pressure spring 18 may be added to the mechanism in order to provide a pressure to be overcome in operating the apparatus 10. A retainer plug 19 is needed to ensure that the locking mechanism 14 will stay in position.

The elastic cord is placed through the apparatus and a loop is established in the cord as shown in the FIG. 1. Upon stretching the elastic cord, the diameter of the cord decreases which allows the locking mechanism to move toward the horizontal support platform. This movement forms an opening smaller than the diameter of the elastic cord when the cord is in its relaxed state. The hole diameter is created by the apertures in the horizontal support platform and the cut outs in the horizontal base aligning. When the elastic cord is released, it expands back to its original diameter and is locked in place. Releasing the cord is accomplished by manually moving the locking mechanism back away from the horizontal support platform which allows the tension to be safely released without detaching the hooked ends of the elastic cord. The spring assists the user in the movement of the locking mechanism but is not required for operation. The apparatus would also be very useful with items like shoe laces to maintain tension and to adjust the length of the lace.

While we have described our invention in connection with specific embodiments thereof, it is clearly to be understood that this is done only by way of example and not as a limitation to the scope of our invention as set forth in the objects thereof and in the appended claims.

We claim:

1. Apparatus for adjusting the length and/or tension of an elastic cord, comprising:

a support platform;

said support platform having a plurality of apertures;

said support platform further having a centerline projection tube located thereon;

a locking mechanism;

said mechanism comprising a base;

said base comprising cut outs at each end of said base;

said base further comprising a tubular extension for positioning said tubular extension within said centerline projection tube of said support platform; and means for retaining said locking mechanism in position relative to said support platform.

2. An apparatus, according to claim 1, wherein:

said retaining means is arranged to maintain said base in spaced, parallel relation with said support platform.

3. An apparatus, according to claim 2, wherein:

said retaining means comprises resilient means for facilitating some variation in the spaced, parallel relationship between said base and said platform.

4. An apparatus, according to claim 1, wherein:

said retaining means for said locking mechanism comprises a pressure providing means abutting said tubular extension;

said retaining means for said locking mechanism further comprises a plug unit to be inserted into the end of said tubular extension of said locking mechanism in position.

5. An Apparatus according to claim 4, wherein:

said pressure providing means is a spring.

6. An elastic cord tensioning and length adjusting apparatus, for use by individuals to strap items in position and maintain them in that position, comprising:

a support platform;

said support platform having a plurality of apertures;

said support platform further having a centerline projection tube located thereon;

a locking mechanism;

said locking mechanism comprising a base;

said base comprising cut outs at each end of said base;

said base further comprising a tubular extension for positioning said tubular extension within said centerline projection tube of said support platform; and means for retaining said locking mechanism.

7. An apparatus according to claim 6 wherein:

said apertures in said support platform comprises for receiving said elastic cord.

8. An apparatus, according to claim 6, wherein:

said cut outs in said base of said locking mechanism comprise means for receiving said elastic cord.

9. An apparatus for adjusting the length and/or tension of and elastic cord, comprising:

a planar support member having two spaced apertures dimensioned to receive an elastic cord and an hollow tube projecting from said support member intermediate said apertures;

a locking mechanism comprising a planar base member having two cut outs dimensioned to receive the elastic cord and a cylindrical extension projecting from said base member, said extension being dimensioned to be received by said hollow tube through a third aperture in said support member; and means for assembling together and said base member, the arrangement being such that, in use, when said extension is received in said hollow tube, said base member and said support member are maintained in substantial parallel relation with adjustable spacing therebetween, the apertures and corresponding cut outs being so dimensioned and positioned that the effective openings for the elastic cord are progressively reduced as dimension between the base member and the support member is reduced thereby to lock around the elastic cord to prevent relative movement between the cord and the apparatus.

* * * * *